United States Patent [19]

Belzer et al.

[11] 3,745,460
[45] July 10, 1973

[54] METHOD AND APPARATUS FOR DETERMINING THE THERMAL INTERNAL RESISTANCE IN SEMICONDUCTORS OF THE SAME TYPE

[75] Inventors: Hans-Joachim Belzer; Gerhard Kubitzki, both of Belecke, Germany

[73] Assignee: Licentia Patent-Verwaltungs-GmbH, Frankfurt, Germany

[22] Filed: Sept. 7, 1971

[21] Appl. No.: 178,189

[30] Foreign Application Priority Data
Sept. 7, 1970 Germany.................. P 20 44 225.5

[52] U.S. Cl........... 324/158 T, 73/15 A, 324/158 D
[51] Int. Cl. ...................... G01r 31/26, G01n 25/00
[58] Field of Search.................. 324/158 D, 158 R, 324/158 T; 73/15 R, 15 A

[56] References Cited
OTHER PUBLICATIONS

Gates et al.; The Measurement . . . ; Semiconductor Products; July 1959; pgs. 21–26.

Carslaw et al.; Conduction of Heat . . . ; Oxford, 1947; pgs. 1, 112–141.
Sidles et al.; Thermal Diffusivity . . . ; Jour. of Aplied Physics; Vol. 25; No. 1; Jan. 1954; pgs. 58–66.
Powell, R. W.; Experiments Using . . . ; Journal of Sci. Instruments; Vol. 34; Dec. 1957; pgs. 485–492.

Primary Examiner—Rudolph V. Rolinec
Assistant Examiner—Ernest F. Karlsen
Attorney—George H. Spencer et al.

[57] ABSTRACT

For determining the internal thermal resistance of a semiconductor wafer, an arrangement is provided in which a metal member supports the bottom of the wafer and a thermosensor contacts the underside of the member and monitors heat transfer from the wafer to the support member which is a function of the internal thermal resistance of the semiconductor. A current pulse is fed to the semiconductor causing heat to generate therein. The detected time interval between cessation of the pulse and detection of maximum heat transfer to the thermosensor leads to determination of the internal thermal resistance.

10 Claims, 4 Drawing Figures

METHOD AND APPARATUS FOR DETERMINING THE THERMAL INTERNAL RESISTANCE IN SEMICONDUCTORS OF THE SAME TYPE

BACKGROUND OF THE INVENTION

The present invention relates to a method and apparatus for quickly determining the internal thermal resistance of semiconductor devices of the same type having a semiconductor wafer.

The known indirect methods for determining semiconductor internal thermal resistance $R_{thIG}$ as well as barrier layer temperature $\delta_{sp}$ are based on the assumption that the relationship between the increase in temperature $\Delta\delta$ in a semiconductor wafer, relative to the wafer support at a temperature $\delta_B$, resulting from a certain electrical load across the barrier layer, and the semiconductor electrical losses $P_v$ is similar to that between the voltage and current of a circuit. The temperature increase can be expressed as:

$$\Delta\delta = \delta_{sp} - \delta_B = P_v \cdot R_{thIG}$$

Simplified, the assumption is that the heat loss resulting in the semiconductor wafer under load originates from a concentrated heat source which has the characteristic of an electric current source. Locally differing temperatures in the semiconductor wafer are combined in a single actual value (barrier layer temperature $\delta_{sp}$). The difference between the barrier layer temperature and the wafer support temperature then corresponds to the terminal voltage of the heat source and the magnitude of this difference is determined by the heat flow impedance. This impedance has the characteristic of a resistive-capacitive impedance and is a representation of the heat conducting and storing capability of the semiconductor layers in the path of the heat flow. The thermal behavior of a pulse-charged semiconductor device can thus be compared with the electrical behavior of a correspondingly pulse-charged impedance which should be imagined to be a chain conductor consisting of a plurality of RC members.

According to the known indirect methods, the internal thermal resistance is determined in continuous operation with a constant thermal energy loss. Since the heat storing capability due to the attainment of the steady state has no effect here, these methods are based on the above-mentioned relationship. To determine therefrom the internal thermal resistance, the values of the energy loss $P_v$ and the wafer support temperature $\delta_B$ are measured directly, and the barrier layer temperature $\delta_{sp}$ is determined with the aid of the previously determinable relationship between $\delta_{sp}$ and the forward voltage drop with a low constant forward measuring current, this constituting a measurement of the forward voltage, or the temperature $\delta_B$ is measured at different forward losses and the temperature $\delta_{sp}$ is eliminated therefrom.

A newer method utilizes the fact that during intermittent continuous operation with constant energy loss the temperature $\delta_{sp}$ and the temperature $\delta_B$ and thus also the temperature difference $(\delta_{sp} - \delta_B)$ is kept constant, and the internal thermal resistance is read from a gauge which measures the forward energy loss but is calibrated for the $R_{thIG}$ measurement. In the intervals of the intermittent continuous operation, the test object is charged with a low forward current to determine and keep constant the temperature $\delta_{sp}$ and the forward voltage is measured. This method has the advantage over the older methods that it permits faster and substantially more dependable measurement of the internal thermal resistance. Certain additional considerations for control means must here be considered, however.

In all the above-described methods the measurement is being made during continuous operation of the semiconductor, with constant energy loss. Thus, the respective measuring results do not reflect the exemplary thermal behavior as it would occur under a pulse-type load. This behavior may be determined, for example, by the effect of impurities in the crystal structure of the semiconductor wafer which may produce temporary local heat accumulations. Particularly for thyristors which are to be used in pulsed current rectifiers, it is important, often even decisive, that the thermal behavior during pulse-type loads be determined. Moreover, in many thyristors the transmission characteristic exhibits irregular jumps in the lower current region so that it is impossible to determine an unequivocal association between the forward current and the forward voltage. In such cases it is thus impossible to measure the barrier layer temperature according to the known $R_{thIG}$ determination methods and much less to maintain it constant.

SUMMARY OF THE INVENTION

The present invention provides a method for determining the internal thermal resistance in semiconductor devices of the same type, such devices include thyristors and rectifier diodes. The present invention determines the thermal behavior of a test object under pulse-type loads without influencing and measuring the barrier layer temperature. Thermal behavior is measured by recognizing a correlation with the internal thermal resistance which is determined according to an indirect measuring method employing a constant load with constant energy loss. With the method according to the present invention, each tested semiconductor device is charged with a current pulse having an amplitude which almost reaches the current surge limit of the device and of such a short pulse duration that at the end of this pulse, heat due to the pulse cannot yet be measured at a wafer support in the form of a housing bottom. The measuring point is as close as possible to the interface between the semiconductor wafer and the housing bottom. The time expiring between the end of the current pulse and the maximum of a resulting temperature pulse occurring after the current pulse is measured and used as a direct measure for the evaluation of the internal thermal resistance.

The present invention also provides a thermoelectric temperature sensor, which has a low time constant compared to the duration of the temperature pulse, a high effectiveness, and a high thermal resistance but a low heat transfer resistance at the measuring point on the housing bottom. This thermosensor is used to convert the temperature pulse into an analog electrical signal and this signal is differentiated and amplified and then fed to a comparator which feeds a d.c. voltage signal of unchanging polarity to a digital counter. The counter is started at the end of the current pulse to measure the expiring time as long as the polarity of the differentiated signal does not change.

According to the method of the present invention, the internal thermal resistance of identical types of semiconductor devices can be measured or correlated in a very short time, i.e., in 50 to 500 ms, depending on the type of the device. Due to the short time required for this test, semiconductor devices of a series can be individually tested in succession. However, a plurality of semiconductor devices of a series can be successively checked in groups or at random if the appropriate number of testing devices and measuring sensors are provided. An arrangement constructed according to an embodiment of the present invention with a thermoelement usable as a temperature sensor for accomplishing the method of the invention for individually testing the semiconductor devices will be explained in detail in the description of the invention provided below.

DESCRIPTION OF THE PREFERRED EMBODIMENTS

Figure 1:
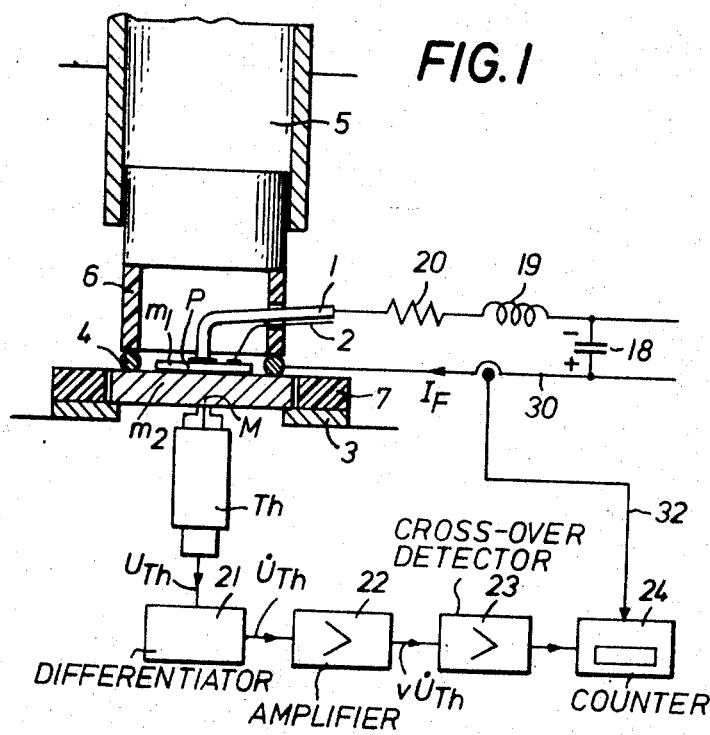
FIG. 1 is a partly pictorial, partly schematic representation of a device for testing the $R_{thIG}$ of an individual semiconductor device according to the invention.

The $R_{thIG}$ of a semiconductor device is known to be determined by the heat transfer conditions in the junction between the semiconductor wafer and a supporting member, which junction is generally effected by soldering. The electrical energy which has been converted into heat in the semiconductor wafer substantially flows through the large-area junction between the wafer and the supporting member, in the form of a housing bottom. As already explained above, faulty heat junctions between semiconductor wafer and housing bottom can be determined according to the known determination method with satisfactory accuracy only at a great loss of time since a thermal equilibrium must be obtained in each case. When the heat transfer is determined according to the method of the present invention this is not necessary. It is only assumed that this method is employed for devices of the same type under the same conditions. This prerequisite is based on the fact referring to FIG. 1, that for devices of the same type, the mass $m_1$ of the semiconductor wafer P and the mass $m_2$ of the wafer support constituting the housing bottom are constant and that they are made of the same material, and also on the fact that it is practically only the mass $m_2$ of the housing bottom and no other housing portions or cooling members which are in thermal contact with the mass $m_1$ of the semiconductor wafer. The $R_{thIG}$ is determined for a device in which the semiconductor wafer is completely connected with the housing bottom as well with the required terminals 1 and 2. The housing bottom is in contact only along a narrow edge zone with a perforated steel plate 3 provided for mounting the test object in the testing arrangement. The object to be tested is fastened by means of a copper ring 4 which is provided as the current connection and which is pressed by a pneumatic cylinder 5 via an insulating tube 6 against the upper side of the housing bottom. If required, a copper ring can also be arranged between the steel plate 3 and the housing bottom so that a minimum of heat is removed from the test object when it is mounted. Heat dissipation by radiation and convection can here be neglected. The lateral edge surface of the housing bottom extends through a rigid woven disc 7 to center the test object. The semiconductor terminals 1 and 2 are inserted through the insulating tube 6 via an opening in the tube.

A significant requirement for the use of the method of the present invention is that the semiconductor wafer is charged with a current pulse $I_F$ as in FIG. 1, during such a short time that the device is sufficiently heated before noticeable heat with, or transfer to, the housing bottom takes place. It has been found that a pulse duration of approximately 10 ms with a current pulse having an amplitude near the permissible current surge limit $I_{FSI}$ of the device P fully meets this requirement.

The heat transfer which then takes place between the semiconductor wafer and the housing bottom is apparent in the time function $\delta_B(t)$ of the housing bottom temperature which begins, at the end of the current pulse, at the level of the ambient temperature, then increases up to a maximum $\delta_{max}$ and finally drops to a level $\delta'$ which is higher than the ambient temperature. The heat exchange is completed at $\delta'$ and the housing bottom and semiconductor wafer have the same temperature $\delta'$.

The course of the temperature pulse leading to heat compensation depends in part on the thermal resistance between the semiconductor wafer and the housing bottom and on the thermal capacities of the masses $m_1$ and $m_2$ taking part in the heat exchange, and partially also on the location of the temperature measuring point on the housing bottom.

In the center M of the underside of the housing bottom, the temperature pulse is highest and shortest when the thermal resistance is uniform along the entire connecting surface between semiconductor wafer and housing bottom. This center is thus the most favorable measuring point from a technilogical point of view. The thermal transfer resistance $R_{thIG}$ influences the position and amplitude of the temperature maximum $\delta_{max}$ of the temperature pulse $\delta(t)$ measured at the same measuring point. Temperature conductivity and thermal capacity of the masses $m_1$ and $m_2$ also make their influence felt but can be considered to be constant for test objects of the same type. The time location $t_{\delta max}$ of the temperature maximum which is symbatic with the height of the maximum in an inverse relation can thus be considered the characteristic dependent of the thermal junction resistance $T_{thIG}$ in test objects of the same type. A result of the invention is that the time position of the temperature maximum is independent of the energy of the current pulse.

An additional significant requirement for the use of the above-described method according to the present invention is that no noticeable, measurable, heat will be removed from the housing bottom during the temperature measurement at measuring point M. Further, the heat transfer resistance between measuring point M and temperature sensor Th is kept constant and sufficiently low. This requirement is decisive with respect to the realization of reproduceable measuring results. It is satisfactorily met with the use of oppositely poled thermoelements Th1 and Th2, constituting temperature sensor Th, having a total of three sensing arms.

Figure 2:
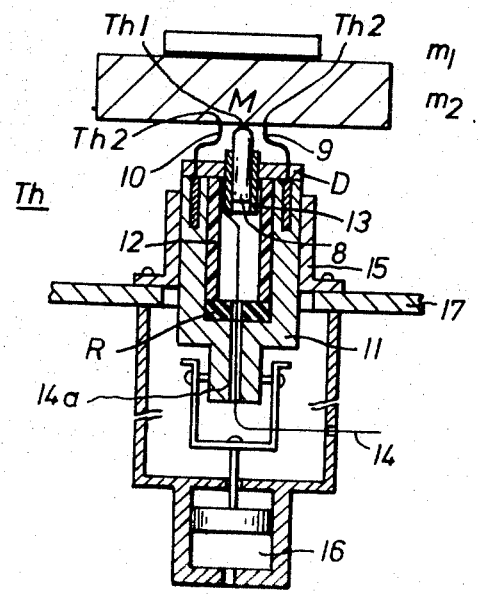
FIG. 2 is a cross-sectional view of the configuration of thermoelements used as a temperature sensor for performing the method according to the present invention.

According to FIG. 2 the first arm is formed of a silicon pin 8, the common arm of the two thermoelements Th1 and Th2 is formed by the housing bottom of the semiconductor device test object, and the third arm by three steel pins 9, and 10, and another not shown, which are electrically connected together. Silicon pin 8 is conically ground at one end and flattened at the peak of the cone so that the brittle silicon material will not break. Silicon pin 8 then has its tip in contact with the housing bottom at the measuring point M so that the thermal connection for Th1 is formed. The three steel pins are arranged at a very slight spacing from, and symmetrically around, silicon pin 8 and also contact the housing bottom at measuring point M so that the thermal connection for Th2 is established.

With this arrangement the thermal connections which are thus formed are subjected to the same temperature, measuring temperature δ, so that the temperature sensor voltage $U_{Th}$ resulting from the difference between the thermal voltages of Th1 and Th2 is independent of temperature fluctuations as well as of the temperature distribution over the housing bottom. With this arrangement no undefinable temperature differences can occur between temperature sensor Th and measuring point M.

The tip of silicon pin 8 is an excellent heat contact with the housing bottom but due to the poor heat conductance of silicon, practically no heat is removed from measuring point M. These properties assure good reproduceability of the temperature measurement. The relatively high thermal capacity of the silicon has a favorable effect on the thermoelectric temperature measurement so that the temperature sensor exhibits a comparatively high degree of efficiency. Furthermore, the arrangement of the three steel pins with respect to the silicon pin 8 substantially eliminates ambient interfering influences on the temperature sensor voltage $U_{Th}$.

The thermosensor of FIG. 2 consists of a steel tube 11 which is closed at one end except for passage of lead 14 carrying the sensor voltage $U_{Th}$. An insulating tube 12 is disposed within tube 11 and the other end of the tube is provided with a brass sleeve 13 into which the silicon pin 8 is fitted. Lead 14 passes through tube 11 and is electrically connected with brass sleeve 13. Although not shown, lead 14 is provided with a shielding connected to the steel tube 11 at a point such as 14a. From the open upper end of steel tube 11, the three steel pins extend upwardly beyond silicon pin 8 and are mounted to be resilient in the axial direction. A perforated disc D prevents these pins from falling out and presses the insulating tube 12, via an insulating disc, against a hard rubber plate R so that the silicon pin 8 is immovably fixed.

The thermosensor Th is perpendicular to the housing bottom and is axially displaceable, guided by a further brass sleeve 15. By means of a pressure cylinder 16, the contact pressure of the pin 8 against the housing bottom is adjustable. The guide sleeve 15 is fastened to a support 17 in a suitable manner so that the thermosensor Th can be adjustably positioned along the housing bottom.

Figure 3:
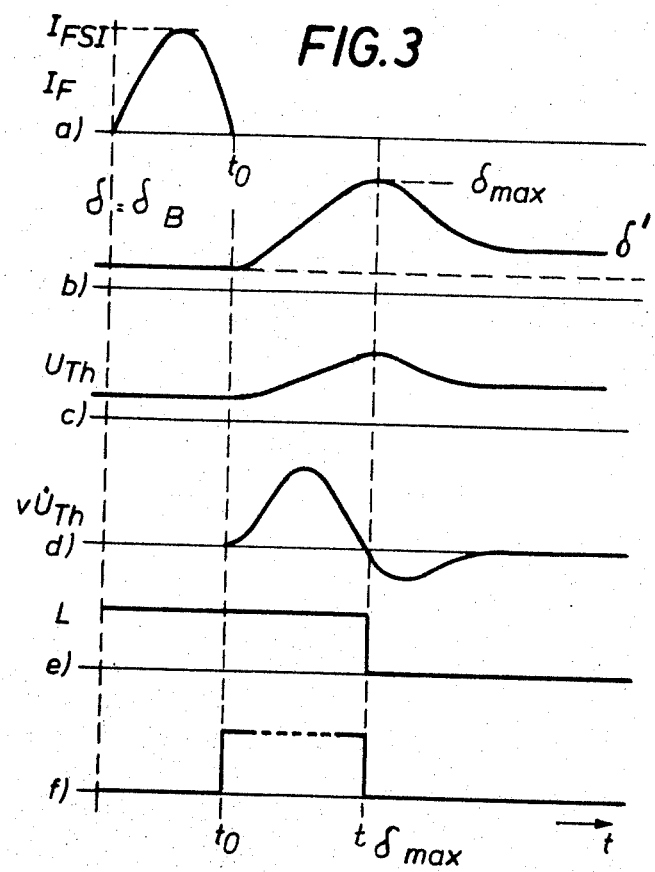
FIG. 3 is a series of diagrams used in explaining the method of the invention.

In order to describe the method according to the present invention for the purely qualitative representation, and for the quantitative determination, of the thermal internal resistance for a single object from a batch of identical semiconductor devices, reference is now made to the diagrams of FIG. 3. After the test object is inserted into the above-described testing arrangement and the thermosensor Th is aligned to the most favorable measuring point M in the center of the housing bottom surface, the test object is supplied with a forward current pulse $I_F(t)$ over lead 30 then to ring 4 of FIG. 1 to the test object. The pulse is of approximately 10 ms duration and has an amplitude no greater than the permissible surge current value $I_{FSI}$ for the test object. The time sequence of this pulse is illustrated in diagram a. Viewing FIG. 1, such a current pulse may be produced, for example, by discharging a capacitor 18 via a choke 19 and an attenuation resistance 20 connected to lead 1.

Returning to FIG. 3, after time $t_0$, when the current pulse $I_F$ ceases, heat produced in the semiconductor wafer is transferred via the thermal transfer resistance existing in the junction between the wafer and the housing bottom, to the measuring point M of the housing bottom with a delay. A temperature pulse δ (t) is produced which has the characteristic shown in diagram b. This pulse which will reach a pulse amplitude of 1 to 2 degrees depending on the type of test object, is sensed by the thermosensor Th and converted into an analog pulse-shaped voltage $U_{th}(t)$, as shown in diagram c. Since the interval between the time $t_{\delta max}$ of the temperature maximum $\delta_{max}$ and the time $t_0$ can be used as the characteristic equivalent value for the internal thermal resistance $R_{thIG}$, the pulse-shaped thermal voltage $U_{th}(t)$ is fed via a differentiating stage 21 (FIG. 1) to an amplifier 22. At the output of the amplifier 22 there results a signal $vU_{th}(t)$ as shown in diagram d. There is a point in time when this signal has a polarity change, or zero cross-over, which coincides with the time $t_{\delta max}$.

A step voltage signal is generated by cross-over detector 23 of FIG. 1, as shown in diagram e, which has the same polarity as the amplified signal until the latter changes its polarity. A count stop signal is then produced by the detector 23 at the step change. The stop signal is fed to a digital counter 24 which had been started by a set and start signal presented by the end of pulse $I_F$ at time $t_0$. The set signal is transmitted along lead 32. The duration of the count $(t_{\delta max} - t_0)$ and thus $R_{thIG}$ can thus be measured.

Depending on the type of the semiconductor device undergoing the testing, the time interval may be between 50 and 500 ms so that the entire process each time takes at most one-half a second. The counting increments of the digital counter 24 are sufficiently short, e.g. 100 μs long, so that $R_{thIG}$ can be measured very accurately. Diagram f shows the counting pulses of digital counter 24 as a broken line.

It should be noted with respect to the described means for performing the method of the present invention that in spite of the high sensitivity of the temperature sensor Th employed, which has only two thermojunctions, the thermal voltage is still low. This requires a high degree of amplification for amplifier 22 and detector 23. Zero point fluctuations may thus occur which lead to signal distortions in the amplifier and to a drifting of the stop signal in the detector.

The amplifier noise may also adversely influence the accuracy of the time measurement. The drift, however, can be easily controlled. The short time required for the method further provides for room for multiple repetition of the process which also makes it possible to obtain an exactly averaged result. A further advantage of the method is that one can always start with any given temperature state of the housing bottom. The time duration $(t_{\delta max} - t_0)$ thus determined initially furnishes a qualitative indication of the internal thermal resistance.

Figure 4:
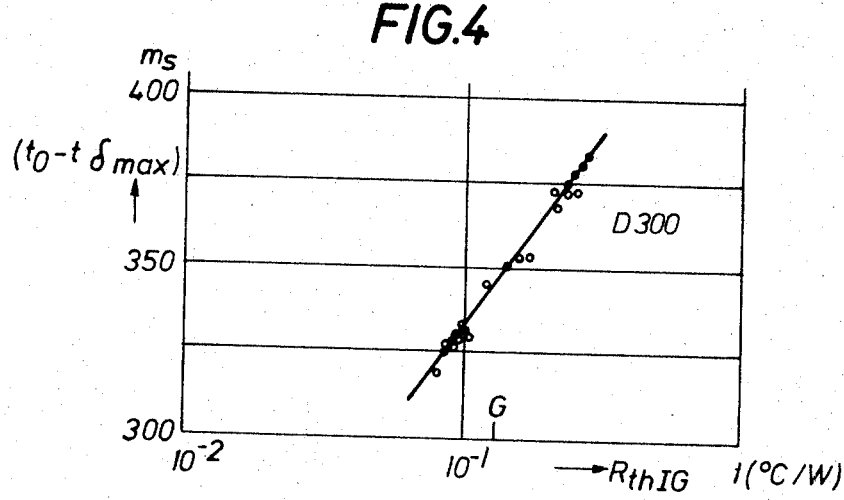
FIG. 4 is a diagram showing the correlation for a device randomly selected from a series of semiconductor diodes of the type D 300, between the $R_{thIG}$ measured under steady state conditions according to a known indirect method and the time measured according to the method of the present invention between the end of a current pulse and the maximum of a resulting temperature pulse. The designation "D 300" signifies a type of power-diode, which is rated for a limiting average on-state current of 300 Amperes.

For the quantitative determination of the same, use may be made of empirically secured correlations, specific to the particular semiconductor type employed, between the values $R_{thIG}$ determined according to known methods and the time difference $t_{\delta max} - t_0$ measured according to the method of the present invention. As an example for this, FIG. 4 shows the correlation for a number of semiconductor diodes of the type D 300. In this diagram, the plot should be considered to be linear in a range which goes beyond the highest permissible $R_{thIG}$ value marked G. Based on this linearity, the time difference to be read at pulse counter 24 can be scaled and given directly as the $R_{thIG}$ value.

The method of the present invention brings further advantages. Since the individual determinations can be rapidly made, they can easily be automated. The apparatus required for this is relatively simple. The method opens the possibility of sensing and checking the homogeneity of the internal thermal resistance over the junction surfaces between the semiconductor wafer and the housing bottom by means of the thermosensor Th. Such tests are significant particularly with large-area devices, for example for locating so-called shrinkholes. Also, the blocking voltage of a test object can be controlled immediately before and after a current pulse. Transmission characteristics with jumps in them will not be incorporated into the measuring result.

It will be understood that the above description of the present invention is susceptible to various modifications, changes and adaptations, and the same are intended to be comprehended within the meaning and range of equivalents of the appended claims.

We claim:

1. A method for determining the internal thermal resistance for a semiconductor device composed of a semiconductor wafer and an underlying support member connected thereto, comprising the steps of:
   subjecting the wafer to a current pulse having a duration that is sufficiently short to prevent measurable heat transfer to the support member during the occurrence of the pulse;
   monitoring the temperature of the support member at a point thereof; and
   measuring the time interval between the end of the pulse and attainment of maximum temperature of the support member at the measuring point, to provide a measurement on the basis of which the internal thermal resistance can be determined, said step of measuring being carried out by: converting the temperature changes in the support member into an electrical analog signal having a maximum point corresponding to the end of the measured time interval; subjecting the analog signal to differentiation to form a differentiated signal having a polarity cross-over point coincident to the maximum point of the analog signal; and detecting the crossover point which represents termination of the time interval.

2. The method of claim 1 wherein the pulse has an amplitude approaching the current surge limit of the wafer.

3. The method of claim 2 wherein the temperature monitoring point for the support member is selected as close as possible to the junction between the member and wafer.

4. Apparatus for determining the internal resistance of a semiconductor device composed of a wafer and associated conductive support member, comprising, in combination:
   means connected to the wafer for current pulsing the wafer with at least one pulse;
   means connected in heat transfer relation to the support member for sensing a resulting temperature rise in the support member and generating a corresponding analog signal;
   means connected to said sensing means for differentiating the analog signal to form a differentiated signal having a polarity cross-over occurring simultaneously with maximum temperature in the support member; and
   means connected to said pulsing means and said differentiating means and responsive to the end of the current pulse and the occurrence of such crossover for measuring the interval therebetween;
   whereby the measured interval can be directly correlated to the internal thermal resistance of the device.

5. An arrangement as defined in claim 4 wherein said sensing means comprises a thermoelectric temperature sensor having a low time constant compared to the duration of the temperature rise in the member, a high efficiency, a high heat resistance, and a low heat transfer resistance.

6. An arrangement as defined in claim 4 wherein each current pulse is of a duration which is relatively short, thereby precluding noticeable transfer of heat from the wafer to the member until termination of the pulse.

7. An arrangement as defined in claim 6 wherein the amplitude of the pulse approaches the surge current limit of the wafer.

8. An arrangement as defined in claim 7 wherein said interval measuring means comprise a counter connected for providing a representation of the interval being measured;
   means connected for initiating operation of said counter in response to termination of the pulse;
   means for detecting the polarity cross-over; and
   means connecting said detecting means to said counter for stopping the operation of said counter when cross-over occurs, thereby measuring the interval.

9. An arrangement as defined in claim 8 wherein said support member is constituted by a housing bottom, and further comprising:
   conductive means mounted in contact with an annular region of said housing bottom; and
   circuit means connected between the wafer and said conductive means to transmit current pulses to the semiconductor device.

10. An arrangement as defined in claim 9 further comprising means connected for adjusting the contact pressure between the housing bottom and said sensing means.

* * * * *